Oct. 9, 1923. 1,470,273
L. H. DEBS
CLAMP FOR BAKING PANS AND THE LIKE
Filed Feb. 6, 1922  3 Sheets-Sheet 1
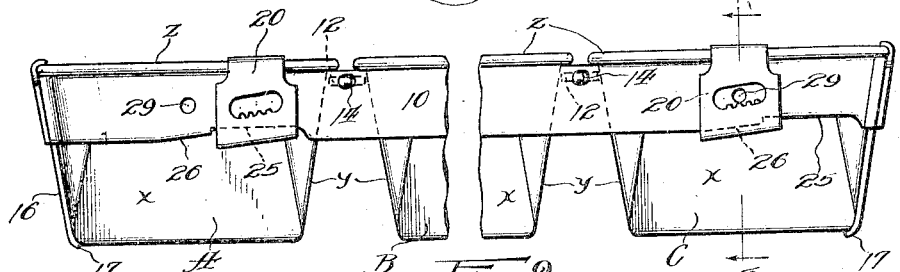
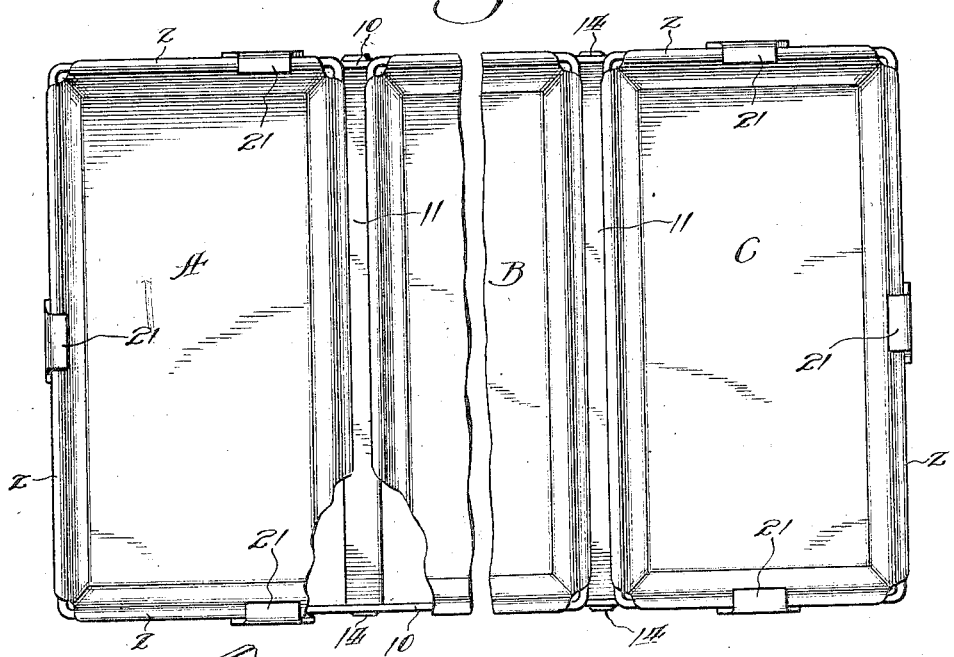
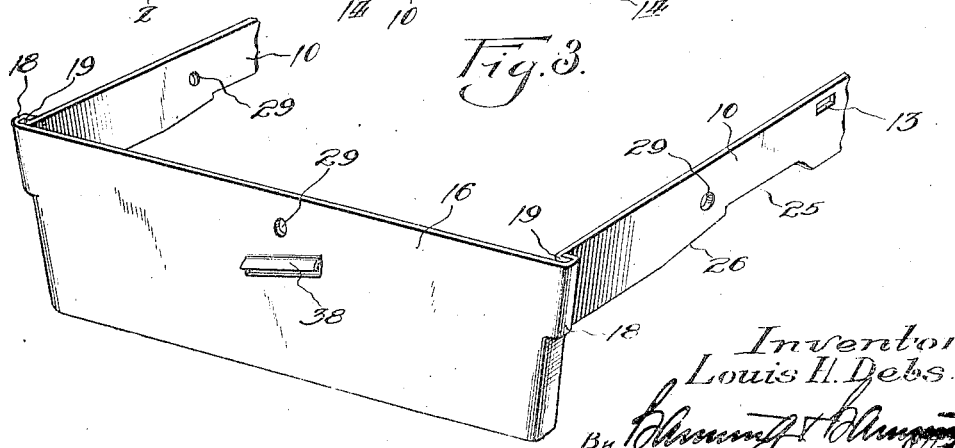
Inventor:
Louis H. Debs Oct. 9, 1923.  1,470,273
L. H. DEBS
CLAMP FOR BAKING PANS AND THE LIKE
Filed Feb. 6, 1922  3 Sheets-Sheet 2
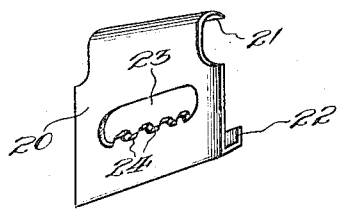
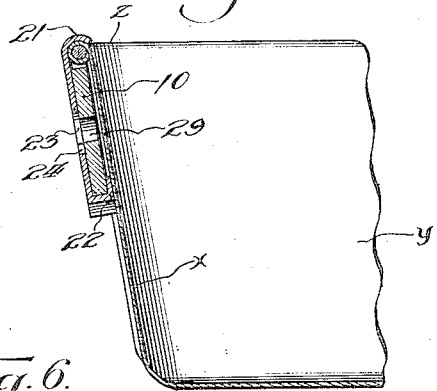
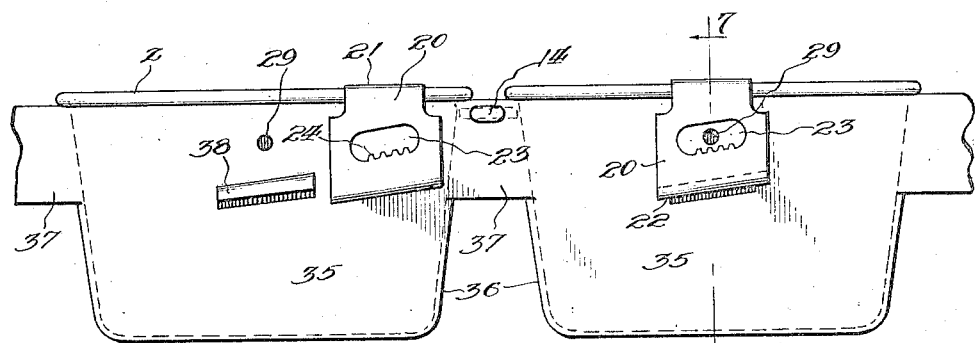
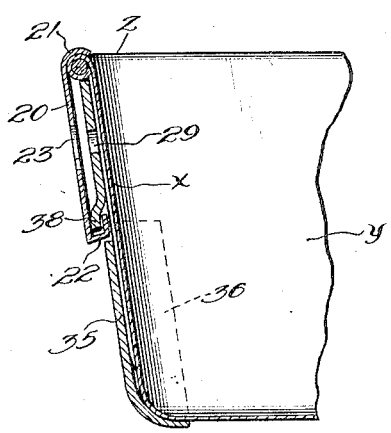
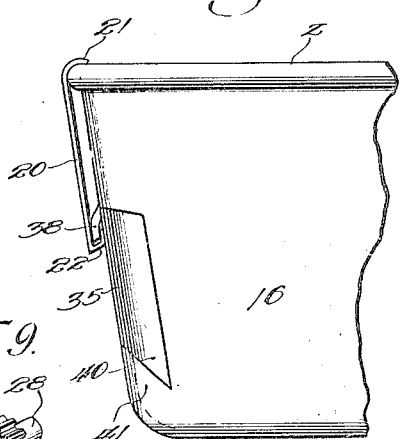
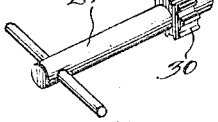
Inventor:
Louis H. Debs.

Oct. 9, 1923.
L. H. DEBS
1,470,273
CLAMP FOR BAKING PANS AND THE LIKE
Filed Feb. 6, 1922  3 Sheets-Sheet 3
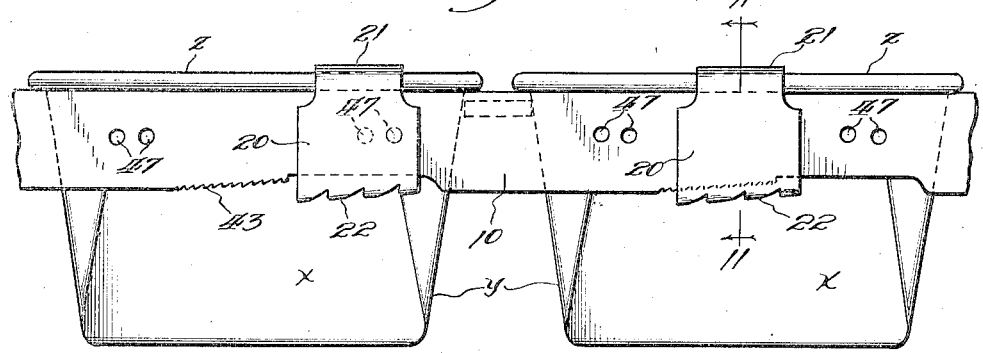
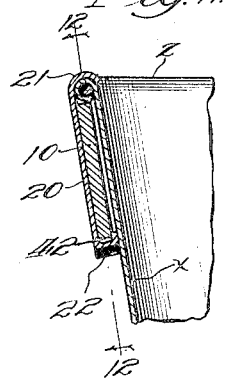
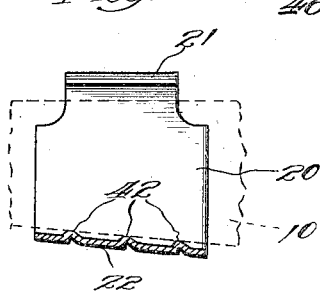
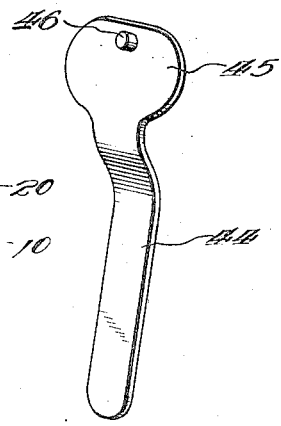
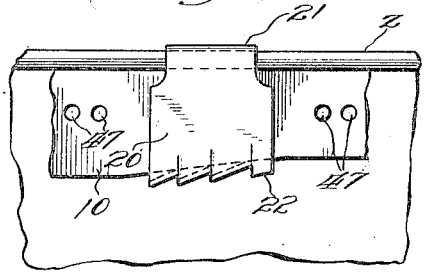
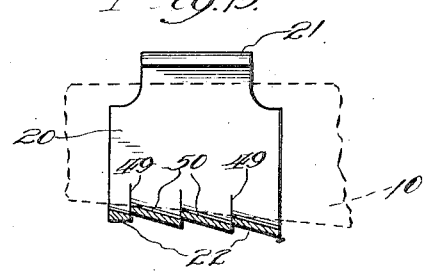
Inventor:
Louis H. Debs, Patented Oct. 9, 1923.

1,470,273

UNITED STATES PATENT OFFICE.

LOUIS H. DEBS, OF CHICAGO, ILLINOIS, ASSIGNOR OF ONE-HALF TO ALBERT COHN, OF CHICAGO, ILLINOIS.

CLAMP FOR BAKING PANS AND THE LIKE.

Application filed February 6, 1922. Serial No. 534,382.

*To all whom it may concern:*

Be it known that I, LOUIS H. DEBS, a citizen of the United States, residing at Chicago, in the county of Cook and State of Illinois, have invented certain new and useful Improvements in Clamps for Baking Pans and the like, of which the following is a specification.

This invention relates to a clamp having certain novel and improved characteristics which render it adaptable for association with other articles, such as baking pans which are commonly arranged in units of five or six for convenience in handling. The invention is also concerned with certain of the elements associated with the clamp by which its effectiveness is enhanced. Other objects and uses, however, will hereinafter appear from the specification and claims, and from the accompanying drawings wherein a preferred embodiment of my invention is illustrated in the following manner:

Figure 1 is a side elevation of a plurality of pans united as through the medium of clamps, strappings, etc.;

Fig. 2 is a plan view thereof;

Fig. 3 is a perspective view showing one end protection plate and its connection with the proximate ends of the two strappings;

Fig. 4 is a perspective view of the clamp per se;

Fig. 5 is an enlarged sectional view taken on line 5—5 of Fig. 1;

Fig. 6 is a view similar to Fig. 1, showing the use of dished shields in lieu of strappings;

Fig. 7 is an enlarged transverse section taken on line 7—7 of Fig. 6;

Fig. 8 is a fragmentary view in elevation looking toward one end of the row of pans, showing the connection between the end protection plate and the dished shield of Fig. 6;

Fig. 9 is a perspective view of a tool or implement that is especially adapted to operate the clamp;

Fig. 10 is a view similar to Fig. 1 showing the use of a clamp of modified construction;

Fig. 11 is a transverse section therethrough taken on line 11—11 of Fig. 10;

Fig. 12 is a longitudinal section through the clamp taken on line 12—12 of Fig. 11;

Fig. 13 is a perspective of a tool that is specially adapted to operate the clamps shown in Figs. 10, 11, and 12;

Fig. 14 is a view similar to Fig. 1 showing a still further modified clamp; and

Fig. 15 is a longitudinal section through the clamp of Fig. 14.

In the drawings I have shown a plurality of baking pans A, B, C, etc., arranged in a row and secured together in unitary relation for convenience in handling. These pans are each formed in the usual manner with slightly tapering ends $x$ and sides $y$, their upper edges $z$ being outturned and reinforced with a wire in accordance with the usual practice. To connect the pans I place them side by side, so that two pieces of strapping 10 may be arranged against their opposite ends directly beneath the under side of the outturned edges $z$.

Between the several pans cross braces 11 may be used such, for instance, as are shown in Figs. 1 and 2. In this construction the ends of each brace are reduced to provide shoulders 12 adapted to bear against the inner sides of the strappings, the brace extremities being extended through slots 13 formed therein. If desired, the ends of the braces may be upset so as to connect fixedly to the strappings. By the means described, the wire edges of each pan are rested upon the two strappings with which a connection is maintained in the manner shortly to be described.

At each end of the pan unit is arranged a protection plate 16, best shown in Fig. 3. The upper edge of this plate is presented against the wire edge of the adjacent pan, while its lower edge 17 may be inturned to partially underlie the pan bottom. Each end of the protection plate in its upper region is bent around substantially 180° (degrees) to provide a hook 18, within which may be received the turned end 19 of the proximate strapping, thus providing in effect an interlock. The ends of the protection plate taper slightly in conformity with the taper of the pan sides, and when joined to the strappings in the manner described, a wedge lock is provided. The row of pans which constitutes the unit is thus firmly bound together by the two strappings which extend along its opposite sides, and by the two protection plates which connect the strapping ends.

The parts which surround the pan unit are fixedly but removably secured to the pans as by means of clamps such as are shown in Fig. 4. Each clamp is in the form of a plate 20 having its upper edge bent over to provide a hook 21 adapted to overlie one wire edge of a pan. The lower edge of the hook is likewise turned in a similar direction to provide a hook 22 in the form of a channel which faces the other hook 21. Formed lengthwise of the plate in a direction which parallels its lower edge is an open slot 23, one long edge of which is provided with teeth 24. A clamp answering to this description is adapted to connect the several pans to the strappings and protection plates in the following manner:

Each strapping is provided along its bottom edge with an elongated notch 25 of sufficient length and depth to clear the lower hook edge of the clamp when its upper hook edge is rested upon the pan edge. At one end of this notch the lower strapping edge is inclined as at 26 toward the full width of the strapping, in the manner best shown in Fig. 1. Initially the clamp is applied in the region of the notch, as appears at pan A, and thereafter the clamp is shifted lengthwise of the strap to a position about as indicated at pan C. Due to this change in position, the lower hook edge of the clamp is required to move along the inclined faces of the strapping after the manner of a wedge during which operation its upper hook edge is tightly drawn down upon the pan edge. This wedging movement may be facilitated by the use of a key 27, such as illustrated in Fig. 9, having a shank whose end 28 may be journaled in an opening 29 formed in the strapping adjacent its inclined face 26, there being a pinion 30 carried fast on the key adapted to engage with the teeth 24 in the clamp slot 23. By rotating the key, it will be evident that the clamp is moved sidewise of itself, or longitudinally of the strapping, the resulting wedge action drawing the strapping firmly against the under side of the wire edge of the pan.

In lieu of the strappings heretofore described, I have suggested in Figs. 6, 7, and 8 a substitute construction as follows: There is shown here a dished shield 35 whose edges 36 are turned to overlie the proximate pan edges excepting only its upper edge beneath which the shield is placed. This construction provides in effect an enclosure for each pan and which is separated from the others but connected therewith as by means of webs 37. Exactly the same form of clamp is used to connect this shield to the pans, but the inclined edge on which the clamp is shifted is formed by striking out from the body of the shield a downwardly depending tongue 38, as clearly shown in the drawings. In order to secure the bottom edge of each shield end to an end protection plate I provide in the latter, as shown in Fig. 8, a dovetailed notch in which may be received a head 40 which extends from the shield end towards the end plate on which also is provided an interlocking head 41 adapted to be engaged thereby. By some such means as this, the shield ends are locked to the end protection plates and in turn are gripped thereby along its lower portion. Due to the use of shields such as have been described, it will be manifest that the pan ends are amply protected against injury in handling.

In Fig. 10 I have shown the ends of two adjacent pans connected through the medium of strapping 10 which is generally similar to that shown in Figs. 1 to 3 inclusive. The clamps, however, which unite the pans to the strappings are somewhat different, in that the wedging face of each lower or channel hook 22 is toothed or serrated as at 42, the inclined engaging face of the strapping having teeth or serrations 43 of a nature adapted to co-operate therewith. In addition the means for sliding the clamp lengthwise of the strapping into wedging relation therewith may take the form of a tool such as is shown in Fig. 13, having a handle 44 which connects to a head 45 of generally oval formation, from which projects a pin 46 adapted to be received within any one of several openings 47 formed in the strapping. When the clamp has been moved from the initial position shown at the left hand side of Fig. 10 to the more advanced position shown at the right hand side thereof, the tool pin 46 may be journaled in one of the strapping openings 47 to the right of the clamp, the handle being extended away therefrom. By rotating the handle toward the clamp, the tool head is brought to bear against the clamp end after the manner of a cam so as to effect its forcible shift to a wedging position. If necessary, the tool can be moved so as to rotate about the nearer of the two openings 47 in order to follow the clamp to a more advanced position.

It will be noted that whatever be the position of rest assumed by the clamp, the interengaging teeth 42 and 43 act to oppose its return movement, regardless of the manner in which the pan unit may be handled. To remove the clamp, the tool may be used once more, this time its pivot pin being journaled in one of the openings to the left-hand side of the clamp. By a reversal of the operations heretofore described, the clamp can then be forcibly retracted to a non-wedging position following which its connection with the pan is no longer maintained.

In Figs. 14 and 15 I have shown a clamp similarly formed with double hooks adapted to co-operate with strapping of the kind shown in Fig. 1. In this construction, however, the lower clamp hook is slitted as at 49 and is formed with a plurality of inclined steps 50 each having an edge which bears sharply against the engaging face of the strapping. Due to the formation of these steps, they are adapted to spring slightly under pressure, the effect being to increase their frictional grip upon the strapping so as to oppose return movement of the clamp. A tool similar to that shown in Fig. 13 may be employed, if desired, to force the clips of Fig. 15 to wedging position, or to effect their withdrawal therefrom.

The advantage of the inventions herein described is that they may be produced at small cost and be applied to any unit of ordinary pans without in any wise altering their construction. When a number of pans arranged in a row are maintained in unitary relation by the means described, it will be apparent that any one of the pans may be removed from the unit without disturbing the others, this operation requiring simply the release of the wedge lock which is effected through the medium of the several clamps. In this matter, one pan may be substituted in the unit for another which may have become unfit for use.

It is to be observed that my invention is concerned with not merely certain means for uniting several pans or other articles in unitary relation, but also discloses a clamping hook or wedge lock which assists in this purpose. Accordingly it is to be understood that, as defined by the claims below, this invention may be adapted for different uses by being variously modified without departing from the principles which impart novelty and utility thereto.

I claim:

1. In combination with a plurality of pans arranged in a row, each having its upper edges outturned, means for securing said pans together comprising a strapping arranged at each side of the row, and a connection between the strappings and each pan end including a clamp having a hook adapted to overlie the pan edge, and another hook adapted to underlie the strapping lower edge on which is formed an inclined face, the latter hook being inclined also to move wedgingly along the strapping whereby the latter is tightened against the under side of the pan's outturned edge, substantially as described.

2. In combination with a plurality of pans arranged in a row, each pan having an outturned edge, means for securing the pans together in unitary relation comprising a strapping having an upper edge adapted to engage the under side of the pan edge, there being formed in the lower edge of the strapping a notch opposite each pan end and adjacent the notch an inclined face, means for connecting the several pans to the strapping comprising in each instance a clamp having upper and lower hooked portions one adapted to overlie the pan edge and the other to underlie the lower strapping edge, the lower hooked portion being adapted to rest against the inclined face of the strapping and when shifted longitudinally thereupon to wedge the strapping tightly against the under side of the pan edge, substantially as described.

3. In combination with a pan having an outturned edge, a strapping arranged adjacent one of its sides immediately beneath its outturned edge, means connecting the strapping to the pan comprising a double hook adapted both to overlie the pan edge and to underlie the strapping's lower edge, the engaging faces of the strapping and hook being inclined to provide a wedge adapted when the hook is shifted laterally to draw the strapping tightly against the pan edge, substantially as described.

4. In combination with a pan having an outturned edge, a strapping arranged adjacent one of its sides beneath the edge, and means connecting the strapping to the pan comprising a double hook adapted both to overlie the pan edge and the strapping's lower edge, the engaging faces of the strapping and hook being inclined to provide a wedge, teeth formed in the hook, there being also formed in the strap adjacent the teeth an opening adapted to receive the end of a rotary tool which is provided with a pinion adapted to mesh with the hook teeth to thereby move the hook longitudinally of the strapping when the tool is rotated, substantially as described.

5. In combination with a pan having an outturned edge, means arranged adjacent one pan side adapted to bear against the under side of its outturned edge, and a device for connecting said means to the pan comprising a double hook adapted both to overlie the pan edge and underlie a portion of said means, the engaging faces of the said means and the hook being inclined to provide a wedge, and elements associated with said means and hook adapted to be engaged by a tool for advancing the hook upon the wedge to clamp said means against the under side of the pan edge, substantially as described.

6. In combination with a pan having an outturned edge, means arranged adjacent one pan side adapted to bear against the under side of its outturned edge, and a device for connecting said means to the pan comprising a double hook adapted to overlie the pan edge and underlie a portion of said means, the engaging faces of the said means and the hook being inclined to provide a wedge, substantially as described.

7. In combination with a plurality of pans arranged in a row, each having its upper edges outturned, means for securing the pans together comprising a strapping arranged at each side of the row, and a connection between the strappings and each pan end, including a clamp having a hook adapted to overlie the pan edge and another hook adapted to underlie the strapping's lower edge on which is formed an inclined face, the latter hook being inclined also to move wedgingly along the strap, whereby the latter is tightened against the under side of the pan's outturned edge, and means on strapping co-operating with other means on the clamp for opposing retractive movement of the clamp, substantially as described.

8. In combination with a pan having an outturned edge, means arranged adjacent one pan side adapted to bear against the under side of its outturned edge, and a device for connecting said means to the pan comprising a double hook adapted to both overlie the pan edge and underlie a portion of said means, the engaging faces of said means and the hook being inclined to provide a wedge and being formed to oppose relative movement in one direction only, substantially as described.

9. In combination with a plurality of pans arranged in a row, each having its upper edges outturned, means arranged adjacent each row side and end adapted to protect the same from its upper edge downwardly to a point below the plane of the pan bottoms, and means for removably connecting each of said pans individually to said protecting means, substantially as described.

10. A clamping device of the kind described adapted to draw together two juxtaposed members one of which is provided with an opening consisting of a plate having double facing hooks one engaging each member, the engaging faces of one hook and member associated therewith being inclined to provide a wedge, there being formed in the plate an opening the edges of which are toothed permitting engagement therewith of a pinioned tool whose end is adapted for journaling in the opening, substantially as described.

11. A clamping device of the kind described adapted to draw together two juxtaposed members one of which is provided with an opening, consisting of a double hook adapted to embrace both of said members and to move longitudinally thereupon, the engaging faces of one hook and member associated therewith being inclined to provide a wedge, there being teeth formed on the hook body adjacent the opening permitting a rotary tool when journaled in the opening to engage with the teeth to advance the hook upon the wedge, substantially as described.

12. A clamping device of the kind described adapted to draw together two juxtaposed members, one of which is provided with an opening, consisting of a single means adapted to slidingly engage each member, certain of the engaging faces of said means and member being inclined to provide a wedge and being further formed to oppose relative movement in one direction, the opening in one of said members serving as a bearing in which may be journaled the pivot pin of a cam tool adapted to force said means to a wedging position, substantially as described.

13. A clamping device of the kind described adapted to draw together two juxtaposed members, consisting of a plate having double facing hooks one engaging each member, the engaging faces of one hook and member associated therewith being inclined to provide a wedge and being formed to oppose relative movement therebetween in one direction, substantially as described.

LOUIS H. DEBS.

Witness:
EPHRAIM BANNING.